(12) United States Patent
Jernigan et al.

(10) Patent No.: US 6,384,180 B1
(45) Date of Patent: May 7, 2002

(54) METHOD FOR MAKING POLYESTERS EMPLOYING ACIDIC PHOSPHORUS-CONTAINING COMPOUNDS

(75) Inventors: Mary Therese Jernigan; Carol Juilliard Greene, both of Kingsport, TN (US); Perry Michael Murdaugh, Lexington, SC (US); Alan Wayne White; Cheuk Chung Yau, both of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/445,628

(22) PCT Filed: Aug. 24, 1999

(86) PCT No.: PCT/US99/19390

§ 371 Date: Aug. 7, 2000

§ 102(e) Date: Aug. 7, 2000

(87) PCT Pub. No.: WO01/14449

PCT Pub. Date: Mar. 1, 2001

(51) Int. Cl.[7] ................................................ C08G 63/78
(52) U.S. Cl. ...................... 528/285; 528/286; 528/298; 528/300; 528/301; 528/302; 528/307; 528/308; 528/308.6; 528/503; 524/81; 524/115; 524/127; 524/186; 524/779
(58) Field of Search ................................ 528/285, 286, 528/298, 300, 301, 302, 307, 308, 308.6, 503; 524/81, 115, 186, 127, 779

(56) References Cited

U.S. PATENT DOCUMENTS

| | | |
|---|---|---|
| 3,028,366 A | 4/1962 | Engle, Jr. et al. |
| 3,441,540 A | 4/1969 | Muller et al. |
| 3,907,754 A | 9/1975 | Tershansy et al. |
| 3,962,189 A | 6/1976 | Russin et al. |

(List continued on next page.)

FOREIGN PATENT DOCUMENTS

| | | |
|---|---|---|
| DE | 195 37 930 A1 | 4/1997 |
| EP | 0 061 414 A1 | 9/1982 |
| EP | 0 525 463 A2 | 2/1993 |
| EP | 0 921 144 A1 | 6/1999 |
| JP | 55040714 | 3/1980 |
| JP | 59217724 | 12/1984 |
| JP | Heisei 10-36491 | 2/1998 |
| JP | 10087804 | 4/1998 |
| JP | 10087808 | 4/1998 |
| WO | WO 97/44376 | 11/1997 |
| WO | WO 97/47675 | 12/1997 |

OTHER PUBLICATIONS

Kamatani, et al., "Effect of Phosphoric Acid on the Polycondensation of Bis(2–hydroxyethyl) Terephthalate Catalyzed by Sb(III) Compounds," Polymer J., vol. 12(2):125–130 (1980).

Schiavone, "Purified Isophthalic Acid (PIA) Modification of PET for use in Stretch–Blow Molded Bottles," Amoco Chemical Company GTSR–111, pp. 1–43 (Feb. 1994).

(List continued on next page.)

*Primary Examiner*—Samuel A. Acquah
(74) *Attorney, Agent, or Firm*—Bernard J. Graves, Jr. Esq.; Wendell R. Guffey, Esq.

(57) ABSTRACT

The process for producing polyesters, and in particular, polyethylene terephthalate (PET) which includes the use of antimony catalyst that is acidic phosphorus additive involves the addition of the catalyst prior to or together with the additive. Moreover, the amount of additive is selected so as to provide a resin that is at least substantially free of non-acidic inorganic compounds such as antimony phosphate which can be formed by the reaction of the catalyst with the additive. The process preferably includes an esterification step, a prepolymer step, and a polymerization step with the antimony catalyst being added prior to, during, or after, the esterification step while the phosphorus-containing additive is introduced prior to or during the prepolymer stage. Polyesters having low levels of elemental phosphorus are also disclosed.

39 Claims, 3 Drawing Sheets

U.S. PATENT DOCUMENTS

| | | |
|---|---|---|
| 4,001,187 A | 1/1977 | Itabashi et al. |
| 4,010,145 A | 3/1977 | Russin et al. |
| 4,025,492 A | 5/1977 | Binsack et al. |
| 4,110,316 A | 8/1978 | Edging et al. |
| 4,122,063 A | 10/1978 | Alexander et al. |
| 4,136,089 A | 1/1979 | Bier et al. |
| 4,176,224 A | 11/1979 | Bier et al. |
| 4,208,527 A | 6/1980 | Horlbeck et al. |
| 4,238,593 A | 12/1980 | Duh |
| 4,254,018 A | 3/1981 | Kowallik et al. |
| 4,385,145 A | 5/1983 | Horn, Jr. et al. |
| 4,401,804 A | 8/1983 | Wooten et al. |
| 4,408,004 A | 10/1983 | Pengilly |
| 4,499,226 A | 2/1985 | Massey et al. |
| 4,501,878 A | 2/1985 | Adams |
| 4,680,371 A | 7/1987 | Rosenfeld et al. |
| 4,824,895 A | 4/1989 | Rosenfeld |
| 4,829,113 A | 5/1989 | Rosenfeld |
| 5,008,320 A | 4/1991 | Nichols |
| 5,017,680 A | 5/1991 | Sublett |
| 5,235,027 A | 8/1993 | Thiele et al. |
| 5,243,022 A | 9/1993 | Kim et al. |
| 5,262,513 A | 11/1993 | Tanaka et al. |
| 5,372,864 A | 12/1994 | Weaver et al. |
| 5,384,377 A | 1/1995 | Weaver et al. |
| 5,608,031 A | 3/1997 | Yau et al. |
| 5,650,469 A | 7/1997 | Long et al. |
| 5,650,481 A | 7/1997 | Yau et al. |
| 5,668,243 A | 9/1997 | Yau et al. |
| 5,744,571 A | 4/1998 | Hilbert et al. |

OTHER PUBLICATIONS

PCT/US99/19385 International Search Report mailed May 4, 2000.

PCT/US99/19380 International Search Report mailed Jul. 25, 2000.

METHOD FOR MAKING POLYESTERS EMPLOYING ACIDIC PHOSPHORUS-CONTAINING COMPOUNDS

RELATED APPLICATION

This application is related to International Application PCT/US99/19385 filed concurrently herewith, which is incorporated herein by reference in its entirety.

FIELD OF THE INVENTION

The present invention relates to processes for producing polyester resins and in particular poly(ethylene) terephthalate (PET) containing low levels of phosphorus containing additives that is suitable for use in a variety of applications including the manufacture of articles such as containers.

BACKGROUND OF THE INVENTION

It is well known in the art that polyesters such as poly (ethylene terephthalate) (PET) are useful for many packaging applications. In fact, PET or modified PET is a polymer of choice for making beverage and food containers, particularly carbonated beverage containers.

Poly(ethylene terephthalate) may be derived from multi-step processes well known in the art which may include the direct esterification of ethylene glycol and terephthalic acid. In addition, it is known that PET can be modified with additional acidic and/or glycol comonomers, e.g., isophthalic acid (or dimethyl isophthalate), 1,4-cyclohexanedimethanol (CHDM), and the like. Modifying PET with additional comonomers may improve some of the physical properties of the resulting polyesters and provide particularly desired properties in an article formed from the polyester particularly in the areas of crystallization and processability.

Polyesters such as PET are typically formed via three-stage processes. The three preferred stages are often referred to as the esterification stage, the prepolymer stage, and the polycondensation stage.

Each of the stages can employ catalysts and certain additives. For example, since both the prepolymer stage and the polycondensation stage employ the same basic reaction, a variety of polycondensation catalyst system are recognized in connection with the prepolymer and polycondensation stages. Examples of such catalysts include titanium, gallium, germanium, tin, and antimony compounds. The use of additives is also known in the art. Additives that are recognized in the art include phosphorus-containing stabilizers such as phosphates and phosphoric acid. In this regard, such phosphorus-containing additives are considered interchangeable.

As background in this regard, attention is directed towards the following patents that discuss the use of phosphorus-containing additives:

U.S. Pat. No. 4,499,226, issued Feb. 12, 1985, and assigned to Goodyear Tire & Rubber Company, discloses process for producing high clarity colorless polyesters which include the use of polycondensation catalysts, cobalt-containing compounds and phosphorus-containing additives.

German Patent Application 195 37 930 A1, opened to public inspection on Apr. 17, 1997, and assigned to Zimmer, AG, also discloses a continuous process for the production of transparent polyesters in which unpurified diol that has been eliminated during the polycondensation stage can be internally recycled into the process.

U.S. Pat. No. 4,110,316, issued Aug. 29, 1978 and assigned to E.I. Dupont de Nemours and Company, discloses a process for producing fiber-forming polyester from ethylene glycol and terephthalic acid that includes the use of color inhibitors such as phosphoric acid and triphenyl phosphite.

U.S. Pat. No. 5,243,022, issued Sep. 7, 1993 and assigned to Korea Institute of Science and Technology, discloses a method for forming polyesters that involves forming prepolymers from a first portion of esterification product in the presence of certain catalysts and stabilizers. The prepolymers are then polycondensed together with a second portion of esterification product to form the polyester.

U.S. Pat. No. 5,235,027, issued Aug. 10, 1993 and assigned to Zimmer Aktiegesellschaft, discloses a process for making a specific modified copolyethylene terephthalate that includes the addition of a phosphorus-oxygen compound before polycondensation in an amount that corresponds to a Sb:P weight ratio of at least four.

However, careful consideration of the art reveals serious errors, inconsistencies and contradictions in the way the art views phosphorus-containing additives, particularly the use of low levels of acidic additives in polyester formation.

SUMMARY OF THE INVENTION

The present invention is based, in part, on the surprising discovery that the choice of phosphorus-containing additive, when employed in connection with certain polymerization catalysts, can have a significant impact on reaction rate of the polymerization process as well as the clarity of the resulting polyester. Further, it was surprisingly found that the optimal addition sequence of the catalyst and phosphorus-containing additive was impacted by the both choice and level of phosphorus-containing additive.

One aspect of the present invention relates to a process that includes:

(a) esterifying at least one dicarboxylic acid component and at least one diol component; and (b) polymerizing the product of step (a) under conditions effective to provide a polyester resin, where polymerization step (b) occurs in the presence of (i) an antimony-based polymerization catalyst and (ii) an acidic phosphorus-containing additive, with the catalyst (i) being added prior to, or together with, the additive (ii), and the acidic phosphorus containing additive (ii) which is selected such that the reaction rate of the polymerization step (b) increases with a decreasing amount of additive (ii). The additive is preferably present in an amount not greater than 15 ppm by weight based on elemental phosphorus in the resulting polymer.

Another aspect of the present invention involves a process for making a polyester resin including the steps of:

(a) esterifying at least one dicarboxylic acid component and at least one diol component; and (b) polymerizing the product of step (a) under conditions effective to provide a polyester resin, where the polymerization step (b) occurs in the presence of (i) an antimony-based polymerization catalyst and (ii) an acidic phosphorus-containing additive, with the catalyst (i) being added prior to, or together with, the additive (ii), the amount of additive (ii) being present in an amount such that the polyester resin that is at least substantially free of inorganic compounds which can be formed by the reaction of the catalyst (i) and additive (ii). The amount is preferably not greater than about 15 ppm based on elemental phosphorus in the resulting polyester.

The processes can include a prepolymer stage between steps (a) and (b). Moreover, the process can further include additional steps such as solid-phase polymerization of the polyester resin from step (b).

In other aspects of the present invention, the antimony-based polymerization catalyst (i) is preferably added prior to the acidic phosphorus-containing additive (ii) and the polymerization step (b) is preferably performed in the absence of added cobalt compound(s).

In another aspect, the present invention relates to a polyester, and in particular, a poly(ethylene terephthalate) (PET) resin or a modified PET resin which is preferably made by the inventive process. In this regard, one or more phosphorus compounds are present in an amount not greater than about 25 ppm, more preferably not greater than about 15 ppm based on elemental phosphorus in the resin. In addition, organic toners, e.g., organic red and/or blue toners, are present in a preferred amount of 0.5 of 10 ppm. Finally, the polymer is preferably at least substantially free of antimony phosphate compounds. The polyester resin preferably has an intrinsic viscosity of about 0.4 to 1.2 dL/g measured at 25 C by dissolving 250 mg of polyester in 50 ml or a solvent consisting of a 60:40 ratio by weight of phenol and tetrachloroethane.

DETAILED DESCRIPTION OF THE PREFERRED EMBODIMENTS

Figure 1:
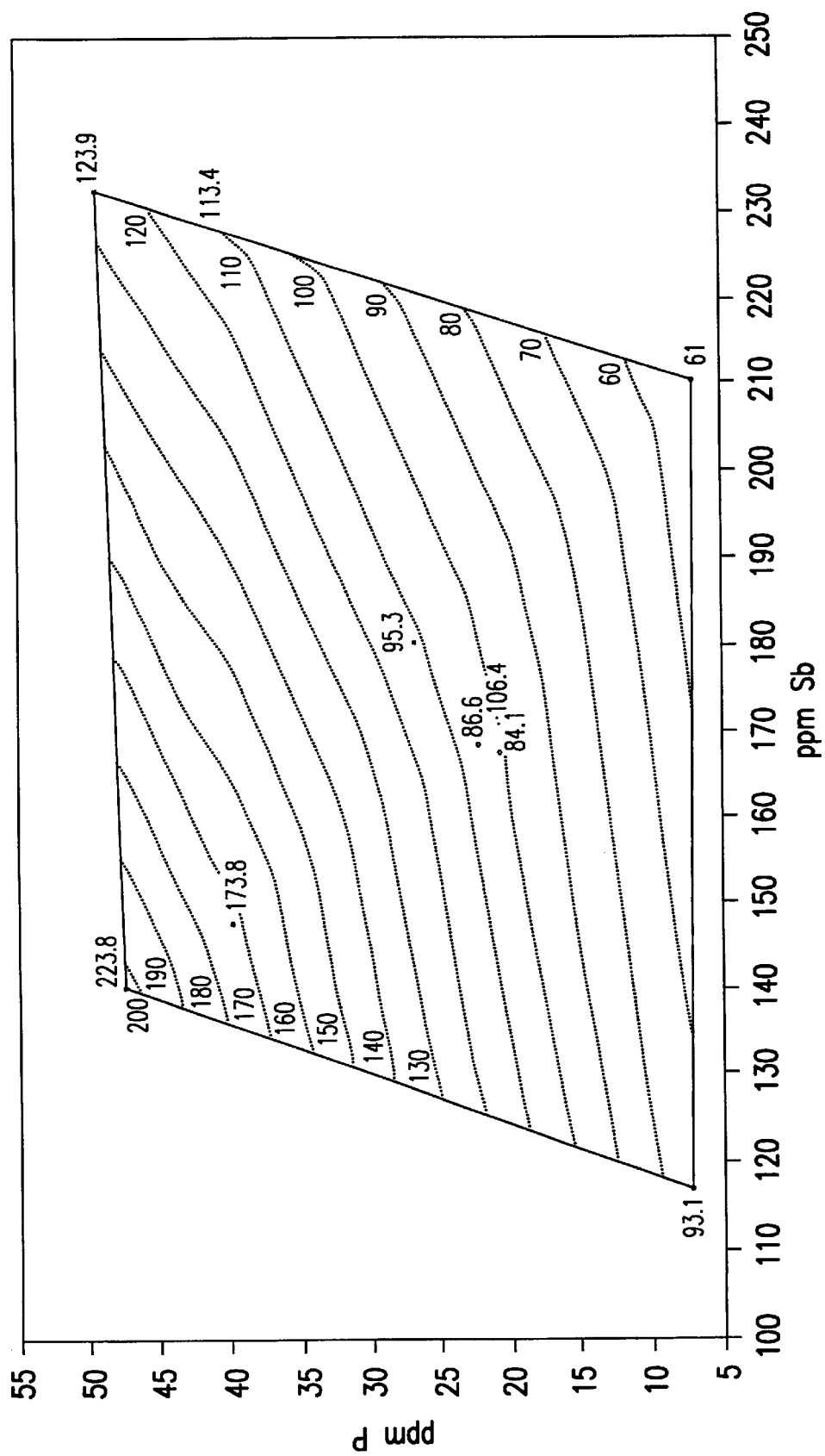
FIG. 1 illustrates the effect on reaction rate, as represented by time in the polycondensation stage, of changing phosphorus additive and antimony catalyst levels when acidic phosphorus-containing compounds are introduced prior to the prepolymer stage and antimony catalysts are introduced prior to the esterification step.

The present invention relates to a process for making polyester resins and in particular, poly(ethylene terephthalate), which employs the use of acidic phosphorus-containing additives. The amount, and point of introduction, for the acidic phosphorus-containing additives are optimized so as to provide for an improved process, e.g., a decreased reaction time, and an improved product, e.g., a polyester having improved clarity.

In one preferred aspect, it has been surprisingly discovered that acidic phosphorus-containing additives such as phosphoric acid, do not react in the same manner as non-acidic phosphorus-containing compounds, such as phosphate triesters. In fact, they can have very different, effects on polymerization rate.

It was also surprisingly found that where relatively low levels of acidic phosphorus-containing compounds are introduced after certain polymerization catalysts, improved reaction rates can be provided at lower levels as compared to where the phosporous additive is added prior to the polymerization catalyst. For example, the inventors have found that lowering the phosphorus level from an acidic phosphorus-containing compound e.g., from 45 ppm to 25 ppm, and from 25 ppm to 8 ppm or even lower, each can significantly increase the polymerization rate, e.g., by 30–40% or more in the laboratory setting. This advantage would be expected to translate into a significantly higher throughput in commercial operations. A particular benefit would be expected in those production facilities where polymerization rate is considered a significant impediment to faster throughput.

It was also surprisingly found that addition low levels of acidic phosphorus-containing compounds after the polymerization catalyst can allow for the reduction, and possibly even elimination of antimony phosphate crystals in the resulting polyester. This ability to reduce both the amount and size of antimony phosphate crystals can effectively reduce the particulate haze in the polyester. For example, where amounts of acidic additive corresponding to less than 10 ppm of phosphorus are employed, little or no antimony phosphate may be found in the catalyst residue.

With the foregoing in mind, the polyesters may be prepared in accordance with techniques that are recognized in the art. To this end, polyesters are any crystallizable polyester homopolymer or copolymer, preferably those polyesters suitable for use in packaging, and particularly food packaging.

Suitable polyesters are generally known in the art and may be formed from aromatic dicarboxylic acids, esters of dicarboxylic acids, anhydrides of dicarboxylic esters, glycols, and mixtures thereof. More preferably the polyesters are formed from diacids such as terephthalic acid, isophthalic acid, and 2,6-naphthalenedicarboxylic acid, and mixtures thereof, and diols such as ethylene glycol, diethylene glycol, 1,4-cyclohexanedimethanol, 1,4-butanediol, and mixtures thereof.

As discussed the process of the present invention can produce the produce the polyester and "modified" polyesters. By "modified" it is meant that the preferred diacids and/or diols are substituted with one or more diacid or diol components. For example, the preferred diol, e.g., ethylene glycol in the case of PET, is substituted with one or more diols and/or the preferred acid component, e.g., terephthalic acid, in the case of PET, is substituted with one or more acid components.

Specifically, the dicarboxylic acid component of the polyester may optionally be substituted with up to about 20 mole percent of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid are: phthalic acid, isophthalic acid, naphthalene-2,6-dicarboxylic acid, 1,4-cyclohexanedicarboxylic acid, 1,3-cyclohexanedicarboxylic acid, stilbene dicarboxylic acid, cyclohexanediacetic acid, 1,12-dodecanedioic acid, diphenyl-4,4'-dicarboxylic acid, succinic acid, glutaric acid, adipic acid, azelaic acid, sebacic acid, mixtures thereof and the like.

In addition, the glycol component may optionally be substituted with up to about 20 mole percent, of one or more different diols other than ethylene glycol. Such additional diols include cycloaliphatic diols preferably having 6 to 20 carbon atoms or aliphatic diols preferably having 3 to 20 carbon atoms. Examples of such diols include: diethylene glycol, triethylene glycol, 1,4-cyclohexanedimethanol, propane-1,2-diol, propane-1,3-diol, butane-1,4-pentane-1, 5diol, hexane-1,6-diol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di(hydroxyethoxy)-benzene, 2,2-bis-(4-hydroxycyclohexyl)-propane, 2,4-dihydroxy-1,1,3,3-tetramethyl-cyclobutaine, 2,2-bis-(3-hydroxyethoxyphenyl)-propane, 2,2-bis-(4-hydroxypropoxyphenyl)-propane, 1,2-cyclohexane diol, 1,4-cyclohexanidiol, mixtures thereof and the like. Polyesters may be prepared from two or more of the above diols. Moreover, the foregoing diols may be in their cis- form, trans- form or mixtures thereof.

The process of the present invention can employ the basic step used in forming polyesters. In the context of the present invention, the preferred stages are:

(1) an esterification stage, including but not necessarily limited to direct esterification; and (2) a polymerization stage, including but not limited to a polycondensation reaction.

Moreover, a prepolymer stage; also including but not limited to polycondensation, is preferably performed between the esterification and polymerization steps.

Although the singular tense is used in connection with these stages, each of stages may include one or more steps or substages. For example, the prepolymer stage may include one or more reactions steps or substages having differing reaction conditions, e.g., progressively lower pressures and temperatures. Finally, although these stages are generally recognized in the art, preferred conditions are set out below for convenience and clarity.

In this regard, the esterification stage typically involves heating a mixture of one or more dicarboxylic acids, preferably aromatic dicarboxylic acids, and one or more diols under suitable conditions. Examples of such conditions include temperatures in the range of about 200° C. to about 300° C., preferably 240° C. to about 280° C., and pressures of about 0 to about 100, preferably about 0 to about 50 psig. Although esterification catalyst(s) are known in the art, it is preferred that no esterification catalyst be employed in the present invention. Suitable colorants may also be added at this point to control the final color of the polyester. The reaction is typically conducted for about 1 to about 4 hours. It should be understood that generally the lower the reaction temperature, the longer the reaction will have to be conducted.

The esterification stage typically produces a monomer and oligomer mixture continuously in a series of one or more reactors. Alternately, the monomer and oligomer mixture could be produced in one or more batch reactors.

In a prepolymer stage, the mixture of polyester monomer and oligomers undergoes a suitable polymerization step, typically melt-phase polycondensation, to produce a low molecular weight precursor polymer. The precursor polymer is produced in a series of one or more reactors operating at elevated temperatures. This can also involve the use of one or more sub-stages in a single reactor. That is, the prepolymer stage can involve the use of one or more reactors operated continuously, one or more batch reactors or even one or more reaction steps or sub-stages performed in a single reactor vessel.

The precise reaction conditions are dependent upon the nature of the reactants and the final product. However, to facilitate removal of excess glycols, water, alcohols, aldehydes, and other reaction products, the reactors are typically run under a vacuum or purged with an inert gas. Inert gas is any gas which does not cause unwanted reaction or product characteristics at reaction conditions. Suitable gases include, but are not limited to $CO_2$, argon, helium and nitrogen. The prepolymer stage is typically conducted at a temperature less than about 300° C., and preferably between about 240° C. and about 290° C. at a pressure sufficient to aid in removing reaction products such as ethylene glycol.

The next stage, which is the polymerization stage, also typically involves the melt-phase polycondensation of the prepolymer product. Although the polymerization stage typically involves the same basic chemistry as the prepolymer stage, the fact that the size of the molecules, and thus the viscosity differs, means that the reaction conditions also differ. A wide variety of reaction conditions, are employed in the art, and as such they all will not be described here. However, the present invention contemplates the use of the wide range of polymerization options that are recognized in the art.

The primary requirement for the polymerization stage according to the present invention is that it be performed in the presence of both a suitable catalyst and a phosphorus additive. In the context of this invention, the catalyst is introduced prior to, or together with, the phosphorus additive. While the exact point of introduction for the catalyst additive is not critical as long as both the catalyst and additive are introduced prior to the beginning of the polymerizations step, and the catalyst and additive are suitably mixed prior to polymerization. However, it is preferred to add the catalyst at least one reactions step, reaction vessel, or reaction sub-stage prior to the additive.

It is further preferred that the catalyst be introduced immediately prior to or during the prepolymer stage, and more preferred that the catalyst be introduced immediately prior to, during or immediately after the esterification step. That is, while the catalyst and the additive may both be introduced immediately prior to polymerizations step, an earlier introduction of catalyst is more preferred.

The phosphorus additive is preferably introduced immediately prior to, or during the prepolymer step or immediately prior to polymerization. When the phosphorus additive is added during esterification it is preferred that it be introduced late in the selected stage, preferably after 90%, more preferably after 95% and still more preferably after 98% conversion in the selected stage.

Any addition sequence that meets the foregoing criteria is suitable. For example, the following arrangements for addition points of the catalyst and additive can be employed:

(1) Introducing the antimony catalyst prior to esterification stage (a) and the phosphorus additive after the esterification step (a) and prior to, or during a prepolymer stage;

(2) Employing at least two reactors and/or reaction sub-stages for the esterification step (a), with the antimony catalyst being introduced prior to or during a second reactor stage, and the phosphorus additive being introduced after the last esterification stage and prior to a prepolymer stage;

(3) Employing at least two reactors and/or sub-stages for a prepolymer step, with the antimony catalyst being introduced after the esterification step (a) but prior to the first prepolymer stage, and the phosphorus-additive being introduced before or during, or after a second prepolymer sub-stage;

(4) Employing two or more sub-stages or reactors for a prepolymer step, with the antimony catalyst being introduced prior to a second prepolymer sub-stage or reactor and the phosphorus additive being introduced after the prepolymer step but before the prepolymerization step (b);

among others.

Where "higher" levels of phosphorus additive are employed, e.g., between 15 ppm or 35 ppm or greater of elemental phosphorus in the resulting polymer, it is more preferred to introduce the phosphorus additive as late as possible within the reaction scheme, thus, addition schemes such as those designated (1), (3) and (4) would be preferred.

The preferred polymerization catalyst for use in the process of the present invention is an antimony-based polymerization catalyst. Suitable antimony based catalyst include antimony (III) and antimony (V) compounds recognized in the art and in particular, diol-soluble antimony (III) and antimony (V) compounds with antimony (III) being most commonly used. Other suitable compounds include those antimony compounds that react with, but are not necessarily soluble in, the diols, with examples of such compounds including antimony (III) oxide.

Specific examples of suitable antimony catalysts include antimony (III) oxide and antimony (III) acetate, antimony (III) glycolates, antimony (III) ethyleneglycoxide and mixtures thereof, with antimony (III) oxide being preferred.

The preferred amount of catalyst added is that effective to provide an elemental antimony level of between about 75 and about 400 ppm by weight of the resulting polyester.

The phosphorus-containing additive employed in the present invention can be any acidic phosphorus-containing compound recognized in the art. Suitable examples of such additives include phosphoric acid, phosphorous acid, polyphosphoric acid, acidic phosphate esters such as phosphate mono- and di-esters, and mixtures thereof, among others.

The acidic phosphorus-containing additive is present in an amount effective to provide a polyester resin that is at least substantially free of inorganic compounds that are reaction products of the catalyst and the additive and can cause haze in the polyester. That is, under certain conditions, a polycondensation catalyst(s) and an acidic phosphorus-containing additives(s) can react with each other to produce certain inorganic compounds, such as antimony phosphate. Such inorganic compounds can cause particulate haze in polyesters.

When acidic phosphorus-containing compounds are added together with, or preferably after, the catalyst, and the level of acidic phosphorus-containing additive(s) is reduced, the formation of such non-acidic inorganic compounds can also be reduced or even eliminated. When a polycondensation process minimizes the formation of such inorganic compounds, the process is more likely to produce polyesters without undesirable levels of particulate haze, which precludes clarity. Accordingly, the process of the present invention is capable of producing a polyester resin "at least substantially free" of such inorganic compounds, and in particular, at least substantially free of antimony phosphates.

By "at least substantially free," it is meant that the polyester resin does not include levels of the above-discussed inorganic compounds such as antimony phosphates; that create a particulate haze which can have a negative visual impact upon the resin melt or article formed from the resin or can be detected by x-ray diffraction.

The preferred amount of acidic phosphates additive is up to about 35 ppm, more preferably up to about 25 ppm, with less than about 15 ppm, and even up to about 10 ppm being still more preferred. Although the chemistry does not impose a lower limit, the amount of typically not less than 1 ppm. The foregoing amounts are by weight of elemental phosphorus in the resulting polyester.

The acidic phosphorus-containing additive is preferably introduced in a solution of the diol(s). To this end, any concentration capable of providing the desired phosphorus levels can be employed. Suitable concentrations are greater than about 1 wt %, with exemplary levels of about 3 to about 15 wt % for the additive in the diol.

Temperatures for the polymerization stage are generally between about 240° C. to about 300° C. and a pressure between about 0 and about 2 mm Hg. Once the desired inherent viscosity (I.V.) is reached, the polymer is pelletized. Precursor I.V. is generally below about 0.7 to maintain good color. The target I.V. is generally selected to balance good color and minimize the amount of solid stating which is required. Preferably, the I.V. of a polyester of this invention is from about 0.40 dl/g to about 1.2 dl/g. Inherent viscosity was measured at 25° C. using 0.50 grams of polymer per 100 ml of a solvent consisting of 60% by weight phenol and 40% by weight tetrachloroethane.

The resulting polymer can then be subjected to further polymerization reaction, e.g., solid phase polymerization (also know as "solid-stating") by techniques which are known in the art and as such are not described in detail here.

Also, although not required, additives normally used in polyesters may be used if desired. Such additives include, but are not limited to colorants, pigments, carbon black, glass fibers, fillers, impact modifiers, antioxidants, stabilizers, flame retardants, reheat aids, acetaldehyde reducing compounds and the like.

In addition, certain organic toners, e.g., blue and red organic toners, such as those toners described in U.S. Pat. Nos. 5,372,864 and 5,384,377, which are incorporated by reference in their entirety, can be used. As discussed in these U.S. Patents, specific examples of suitable blue toners include substituted 1,4-bis(2,6-dialkylanilino) anthraquinones) while suitable red toners include anthraquinone and anthrapyridone (3-H-dibenz[f,ij] isoquinoline-2,7-dione) compounds. Toner(s) can be present in a total preferred amount of about 0.5 to about 10 percent by weight based on the polymer, with the blue toner(s) preferably present in an amount of about 1 to about 7 percent by weight and the red toner(s) preferably present in an amount of about 0.5 to about 3 percent by weight.

The polyester is preferably devoid of any added cobalt compounds. For example, while certain very minor amounts of certain cobalt compounds may be present with the diacid and/or diol starting materials, cobalt compounds are not added during the process. In addition, the polyester is preferably similarly free of zinc, gallium and silicon compounds.

While the resin can optionally contain polyfunctional monomers, e.g., trifunctional or tetrafunctional comonomers such as trimellitic anhydride, trimethylolpropane, pyromellitic dianhydride, pentaerythritol, and the like. That is, such comonomers may or may not be present in the resin.

The polyesters according to the present invention can be used in forming a variety of articles including sheets, films, tubing, profiles, preforms, fibers, woven and shaped articles, such as containers, and thermoformed articles such as trays and the like.

The present invention will now be described in terms of the following example which example are offered to illustrate the invention. The examples, however, in no way limit the scope of the invention.

EXAMPLES

A. Esterification Procedure

Terephthalic acid (TPA) was esterified with plant grade ethylene glycol (EG) and distilled cyclohexane dimethanol (CHDM), where the CHDM content of the copolyester was one and a half more percent of the total glycols. The esterification was done in a continuous unit and was followed by batch-wise polycondensation. The esterification was carried out in two continuous reactors connected in series (R1 and R2). At third vessel (R3) was used as a flash tank and for collection of the esterification product. The fixed volume reactors had approximately a 2:1 volume ratio with 2230 mL in R1 and 1100 mL in R2. The feed mole ratio of total glycols to terephthalic acid was 1.35. The amount of CHDM in the feed was 1.5 mole percent of the terephthalic acid in the feed slurry, with the excess diol in the feed slurry being ethylene glycol. Slurry ingredients were mixed in a blender and added to a feed tank.

The feed rate was 10 mL/min. The temperature target in R1 was 262 deg. C. The temperature target in R2 was 267 deg. C. The pressure target for R1 and R2 were 36.5 PSIG and 18.5 PSIG, respectively. Substantially all the ethylene glycol vaporized from R1 was condensed and returned directly to R1.

In the esterification phase of the designed experiment, the factors being varied were additive type and level. The additive or catalyst was mixed into the TPA/glycol slurry. For a summary of the additive or catalyst type and level target for each run, see the table below.

| Sample | Additive/Catalyst | Level Target (ppm) | Phosphorus Source |
|---|---|---|---|
| 1 | None | | |
| 2 | P | 30 | $H_3PO_4$ |
| 3 | P | 50 | $H_3PO_4$ |
| 4 | P | 30 | $H_3PO_4$ |
| 5 | P | 10 | $H_3PO_4$ |
| 6 | P | 62 | $H_3PO_4$ |
| 7 | P | 30 | $H_3PO_4$ |
| 8 | Sb | 200 | |
| 9 | Sb | 250 | |
| 10 | Sb | 200 | |
| 11 | Sb | 150 | |
| 12 | Sb | 250 | |
| 18 | Sb | 150 | |
| 19 | P | 30 | $H_3PO_4$ |
| 20 | P | 10 | $H_3PO_4$ |

The additive or catalyst solutions were made per the following procedures. A phosphorus concentration target of 3.5 wt. % was used for the phosphorus solution. Phosphoric acid (13.03 g of 85%, Food Grade, FMC) was weight into a tared glass bottle. Ethylene glycol was added until the total solution weight was 100.00 g. A magnetic stir bar was added, and the mixture was stirred.

A solution of antimony oxide in ethylene glycol was made with a target antimony concentration of 1.2 wt %. Antimony oxide (7.37 g, Fisher) was added into a tared, three-necked, 1-L round-bottomed flask. Ethylene glycol was added until the total solution weight was 500.00 g. The flask was fitted with a heating mantle, condenser, a stopper and a paddle stirrer. The condenser was connected to a nitrogen source and vented through a bubbler to keep air from entering the system. An insulating jacket was placed on the exposed upper portion of the flask. The flask was heated with stirring until the EG was refluxing vigorously. The mixture was held at reflux for at least 3 hours. The mixture was cooled and filtered through a 0.22 micron cellulose acetate, supported plain filter by Micron Separations, Inc.

Oligomers made with a given additive were produced in the continuous unit in a block to minimize the magnitude of the transition required. Within a block for a given additive, the target levels were randomized. In the interest of minimizing transitions, the highest target level was not run at the beginning of a block. The unit was run for twenty-four hours to make each oligomer. Product was collected in a nitrogen-purged, covered, steel beaker, surrounded by dry ice. The beaker was changed about every three hours. The materials from the last three beakers-representing the last 9 hours of a run-were ground and analyzed. Before polymerization, the beakers judged to be comparable were combined in a large bag with shaking.

The carboxyl end groups were determined by titration with base. Additive and catalyst levels were measured by X-ray fluorescence (XRF). Degree of polymerization and mole % reacted CHDM were obtained by NMR spectroscopy of a phenol and 1,1,2,2-tetrachloroethane solution. Percent conversion calculations combined carboxyl end groups and NMR data. After samples were hydrolyzed and silylated, the weight percent of diethylene glycol was measured via a gas chromatography method. Molecular weights were determined by gel permeation chromatography.

Example 1: Esterification in the Presence of a Target of 150 ppm Antimony

The slurry put in the feed tank consisted of 3270 g of Amoco TPA, 1585 g of EG, 42.6 g of CHDM, and 46.3 g of antimony solution (x-ray fluorescence measurement: 0.0124 g antimony/g solution). Analyses on the esterification product (Sample 18) resulted in the following data: carboxyl end groups of 370 meq KOH/kg, a percent conversion of carboxyl end groups to ester end groups of 96.3%, a degree of polymerization of 5.6, an antimony level of 135 ppm, a diethylene glycol (DEG) level of 1.46 wt. %, a reacted CHDM level of 1.43 mole %, a number-averaged molecular weight of 913 g/mole, and a weight-averaged molecular weight of 1621 g/mole.

Example 2: Esterification in the Presence of a Target of 250 ppm Antimony

The slurry put in the feed tank consisted of 3270 g of Amoco TPA, 1556 g of EG, 42.6 g of CHDM, and 76.5 g of antimony solution (x-ray fluorescence measurement: 0.0125 g antimony/g solution). Analyses on the esterification product (Sample 9) resulted in the following data: carboxyl end groups of 378 meq KOH/kg, a percent conversion of carboxyl end groups to ester end groups of 96.2%, a degree of polymerization of 5.5, an antimony level of 232ppm, a diethylene glycol (DEG) level of 1.48 wt. %, a reacted CHDM level of 1.43 mole %, a number-averaged molecular weight of 875 g/mole, and a weight-averaged molecular weight of 1640 g/mole.

Example 3: Esterification in the Presence of a Target of 10 ppm Phosphorus

The slurry put in the feed tank consisted of 3270 g of Amoco TPA, 1630 g of EG, 42.6 g of CHDM, and 1.06 g of phosphoric acid solution (x-ray fluorescence measurement: 0.0360 g phosphorus/g solution). Analyses on the esterification product (Sample 20) resulted in the following data: carboxyl end groups of 343 meq KOH/kg, a percent conversion of carboxyl end groups to ester end groups of 96.5%, a degree of polymerization of 5.3, a phosphorus level of 7 ppm, a diethylene glycol (DEG) level of 1.64 wt. %, a reacted CHDM level of 1.33 mole %, a number-averaged molecular weight of 900 g/mole, and a weight-averaged molecular weight of 1606 g/mole.

Example 4: Esterification in the Presence of a Target of 62 ppm Phosphorus

The slurry put in the feed tank consisted of 3270 g of Amocol TPA, 1625 g of EG, 42.6 g of CHDM, and 6.57 g of phosphoric acid solution (x-ray fluorescence measurement: 0.0361 g phosphorus/g solution). Analyses on the esterification product (Sample 6) resulted in the following data: carboxyl end groups of 365 meq KOH/kg, a percent conversion of carboxyl end groups to ester end groups of 96.3%, a degree of polymerization of 5.7, a phosphorus level of 48 ppm, a diethylene glycol (DEG) level of 1.95 wt. %, a reacted CHDM level of 1.30 mole %, a number-averaged molecular weight of 899 g/mole, and a weight-averaged molecular weight of 1660 g/mole.

B. Polymerization Procedure

The melt-phase polymerization stage was run in random order. Esterification products were prepared per the preceding section. Ground esterification product (206 g) was weighed into a one-liter, single-necked, round-bottomed flask. A 316 L stainless steel paddle stirrer and a glass polymer head were attached to the flask. After attaching the polymer head to a side arm and a purge hose, two nitrogen purgers were completed. The polymerization reactor was operated under the control of a CAMILE™ automation system. After a molten bath of Belmont metal was raised to surround the flask, the CAMILE™ array, was initiated. See the following table for the polymerization conditions. In a CAMILE™ ramp is defined as a linear change of vacuum, temperature or stir speed during the specified stage time. After the melting stage (#2) ended, a 5-minute catalyst addition stage (190 3) began, and the appropriate additive or catalyst solution was added within the last minute of this stage. The additive or catalyst solutions were prepared as described in the Esterification Procedure section. The stirring system was automatically calibrated after stage four and prior to stage five. The finisher stage (190 13) was terminated when the power reached 4.75% three times. Polymers were cooled to ambient temperature.

CAMILE Polymerization Array

| Stage Number | Stage Time (min.) | Temp. (° C.) | Vacuum (torr) | Stir Speed (rpm) |
|---|---|---|---|---|
| 1 | 0.0 | 265 | 760 | 0 |
| 2 | 15 | 265 | 760 | 150* |
| 3 | 5.0 | 265 | 760 | 200* |
| 4 | 10 | 265 | 15* | 200 |
| 5 | 1.0 | 265 | 15 | 100* |
| 6 | 47 | 275* | 15 | 100 |
| 7 | 1.0 | 275 | 15 | 50* |
| 8 | 40 | 275 | 15 | 50 |
| 9 | 5.0 | 275 | 1.5* | 50 |
| 10 | 5.0 | 275 | 0.5* | 50 |
| 11 | 5.0 | 275 | 0.5 | 50 |
| 12 | 1.0 | 275 | 1.5* | 50 |
| 13 | variable | 275 | 1.5 | 50 |

*= Ramp

The polymers were chopped and ground to pass a 3 mm screen. Ground polymers were shaken on a 40-mesh sieve fitted with a lid and pan. The lid and the pan were removed. A second 40-mesh sieve was placed on top of the first. Compressed air was blown through the pair of sieves. This dust removal process reduced the number of fines that adhered to larger particles during the sieving process. The fines would solid-phase polymerize quickly and adversely affect comparisons. The +40 mesh portion of each polymer was shaken through a series of sieves: 10, 12, 14, 16, 18 and 20 mesh. The polymer fraction on each sieve was weighted. To conserve the +12 to +20 mesh portion of each polymer to be used in solid stating, −20/+40 mesh portion of each polymer was used for precursor testing, except for color.

For each sieved polymer, the weights on each sieve (except the 10 mesh) were compared. For each sieve size, the smallest weight among the samples was noted.

Combining the smallest weight available for each sieve size, a weight distribution common to all the samples was defined. By minimizing particle size differences among the preparative samples, the standard blend enabled more internally consistent solid-stating rate studies. This standard blend had a total weight of 80.5 g where 8.4 grams were −10/+12 mesh, 32.54 grams were −12/+14 mesh, 20.27 grams were −14/+16 mesh, 14.48 grams were −16/+18 mesh, and 4.81 grams were −18/+20 mesh grinds. Color was measured on the precursor blend.

The inherent viscosity (IV) was measured at 25 deg. C by dissolving 0.50 grams of polymer in 100 mL of 60% phenol and 40% 1,1,2,2-tetrachloroethane by weight. Additive and catalyst levels were measured by X-ray fluorescence (XRF). The carboxyl end groups were determined by titration with base. Color was measured using a Hunter Lab Color test, which was reported in CIELAB units. The diethylene glcyol (DEG) level was measured by dissolving 22 to 28 mg of polymer in a solvent mixture consisting of 70% chloroform-d and 30% trifluoroacetic acid-d and obtaining the NMR spectrum on a 500 MHz instrument.

Example 5: Polymerization of Esterification Product #18 (135 ppm Sb) with Prepolymer Addition of 7 ppm of Phosphorus Ground esterification product (Sample 18, 206 g) was weighed into a one-liter, single-necked round-bottom flask. Phosphoric acid (0.03 mL of 3.60 wt./wt. % P solution) was added within the last minute of stage 3. The finisher time (length of stage 13) was 93 minutes. Analyses on the polymer resulted in the following data: IV of 0.552 gL/g, an antimony level of 117 ppm, a phosphorus level of 8 ppm, carboxyl end groups of 14.0 meq/kg, a L* color of 89.3, an a* color of −1.1, a b* color of 4.5, and a DEG level of 1.70 wt. %.

Example 6: Polymerization of Esterification Product #18 (135 ppm Sb) with Prepolymer Addition of 40 ppm of Phosphorus Ground esterification product (Sample 18, 206 g) was weighed into a one-liter, single-necked round-bottom flask. Phosphoric acid (0.22 mL of 3.60 wt./wt. % P solution) was added within the last minute of stage 3. The finisher time (length of stage 13) was 174 minutes. Analyses on the polymer resulted in the following data: IV of 0.552 dL/g, an antimony level of 147 ppm, a phosphorus level of 41 ppm, carboxyl end groups of 12.9 meq/kg, a L* color of 89.7, an a* color of −1.1, a b* color of 5.3, and a DEG level of 1.74 wt. %.

Example 7: Polymerization of Esterification Product #18 (135 ppm Sb) with Prepolymer Addition of 49 ppm of Phosphorus Ground esterification product (Sample 18, 206 g) was weighted into a one-liter, single-necked round-bottom flask. Phosphoric acid (0.27 mL of 3.60 wt./wt. % P solution) was added within the last minute of stage 3. The finisher time (length of stage 13) was 224 minute (3.7 hours). Analyses on the polymer resulted in the following data: IV of 0.564 dL/g, an antimony level of 140 ppm, a phosphorus level of 48 ppm, carboxyl end groups of 14.1 meq/kg, a L* color of 89.7, an a* color of −1.0, a b* color of 5.2, and a DEG level of 1.73 wt. %.

Example 8: Polymerization of Esterification Product #9 (232 ppm Sb) with Prepolymer Addition of 7 ppm of Phosphorus Ground esterification product (Sample 9, 206 g) was weighed into a one-liter, single-necked round-bottom flask. Phosphoric acid (0.03 mL of 3.60 wt./wt. % P solution) was added within the last minute of stage 3. The finisher time (length of stage 13) was 60 minutes. Analyses on the polymer resulted in the following data: IV of 0.551 dL/g, an antimony level of 211 ppm, a phosphorus level of 7 ppm, carobxyl end groups of 11.0 meq/kg, a L* color of 89.3, an a* color −1.3, a b* color of 4.7, and a DEG level of 1.70 wt. %.

Example 9: Polymerization of Esterification Product #9 (232 ppm Sb) with Prepolymer Addition of 40 ppm of Phosphorus Ground esterification product (Sample 9, 206 g) was weighed into a one-liter, single-necked round-bottom flask. Phosphoric acid (0.22 mL of 3.60 wt./wt. % P solution) was added within the last minute of stage 3. The finisher time (length of stage 13) was 111 minutes. Analyses on the polymer resulted in the following data: IV of 0.551 dL/g, an antimony level of 227 ppm, a phosphorus level of 40 ppm, carboxyl end groups of 12.7 meq/kg, a L* color of 89.8, an a* color of −0.9a b* color of 4.4, and a DEG level of 1.70 wt. %.

Example 10: Polymerization of Esterification Product #9 (232 ppm Sb) with Prepolymer Addition of 49 ppm of Phosphorus Ground esterification product (Sample 9, 206 g) was weighed into a one-liter, single-necked round-bottom flask. Phosphoric acid (0.27 ml of 3.60 wt./wt. % P solution) was added within the last minute of stage 3. The finisher time (length of stage 13) was 124 minutes. Analyses on the polymer resulted in the following data: IV of 0.566 dL/g, an antimony level of 233 ppm, a phosphorus level of 50 ppm, carboxyl end groups of 12.9 meq/kg, a L* color of 89.7, an a* color of −1.0, a b* color of 4.1 and a DEG level of 1.70 wt./%.

Example 11: Polymerization of Esterification Product #20 (7 ppm P) with Prepolymer Addition of 135 ppm of Antimony Ground esterification product (Sample 20, 206 g) was weighed into a one-liter, single-necked round-bottom flask. Antimony glycolate (2.3 mL of 1.11 wt./wt. % Sb solution) was added within the last minute of stage 3. The finisher time (length of stage 13) was 104 minutes. Analyses on the polymer resulted in the following data: IV of 0.557 dL/g, an antimony level of 122 ppm, a phosphorus level of 8 ppm, carboxyl end groups of 10.9 meq/kg, a L* color of 89.8, an a* color of −1.3, a b* color of 5.5, and a DEG level of 1.82 wt. %.

Example 12: Polymerization of Esterification Product #6 (48 ppm P) with Prepolymer Addition of 135 ppm of Antimony Ground esterification product (Sample 6, 206 g) was weighed into a one-liter, single-necked round-bottom flask. Antimony glycolate (2.3 mL of 1.11 wt./wt. % Sb solution) was added within the last minute of stage 3. The finisher time (length of stage 13) was 119 minutes. Analyses on the polymer resulted in the following data: IV of 0.567 dL/g, an antimony level of 123 ppm, a phosphorus level of 43 ppm, carboxyl end groups of 14.2 meq/kg, a L* color of 89.3, an a* color of −0.9, a b* color of 5.1and a DEG level of 2.23 wt. %.

Example 13: Polymerization of Esterification Product #20 (7 ppm P) with Prepolymer Addition of 232 ppm of Antimony Ground esterification product (Sample 20, 206 g) was weighed into a one-liter, single-necked round-bottom flask. Antimony glycolate (4.3 mL of 1.11 wt./wt. % Sb solution) was added within the last minute of stage 3. The finisher time (length of stage 13) was 76 minutes. Analyses on the polymer resulted in the following data: IV of 0.567 dL/g, an antimony level of 231 ppm, a phosphorus level of 9 ppm, carboxyl end groups, of 9.9 meq/kg, a L* color of 89.4, an a* color of −1.3, a b* color of 5.2, and a DEG level of 1.80 wt. %.

Example 14: Polymerization of Esterification Product #6 (48 ppm) with Prepolymer Addition of 232 ppm Antimony Ground esterification product (Sample 6, 206 g) was weighed into a one-liter, single-necked round-bottom flask. Antimony glycolate (4.0 mL of 1.19 wt./wt. % Sb solution) was added within the last minute of stage 3. The finisher time (length of stage 13) was 88 minutes. Analyses on the polymer resulted in the following data: IV of 0.543 dL/g, an antimony level of 214 ppm, a phosphorus level of 39 ppm, carboxyl end groups of 10.5 meq/kg, a L* color of 87.9, an a* color of −0.7, a b* color of 5.3, and a DEG level of 2.20 wt. %.

Per examples 5–10, when phosphoric acid was added to esterification product containing antimony (antimony early & phosphoric acid late(, the finisher time increased significantly with increasing phosphorus level, especially at the lower antimony level. At low level of phosphorus, the finisher times were faster. When antimony was added to esterification product containing phosphorus from phosphoric acid (phosphoric acid early & antimony late) per examples 11–14, the finisher times were long at low phosphorus levels, relative to the antimony early & phosphoric acid late option. At low levels of phosphorus, adding the antimony early and the phosphoric acid late is preferably to adding the phosphoric acid early and antimony late with respect to finisher times. The finisher time needed to reach a given target IV is an indication of among other things, polycondensation rate: the shorter the time, the faster the rate.

Figure 2:
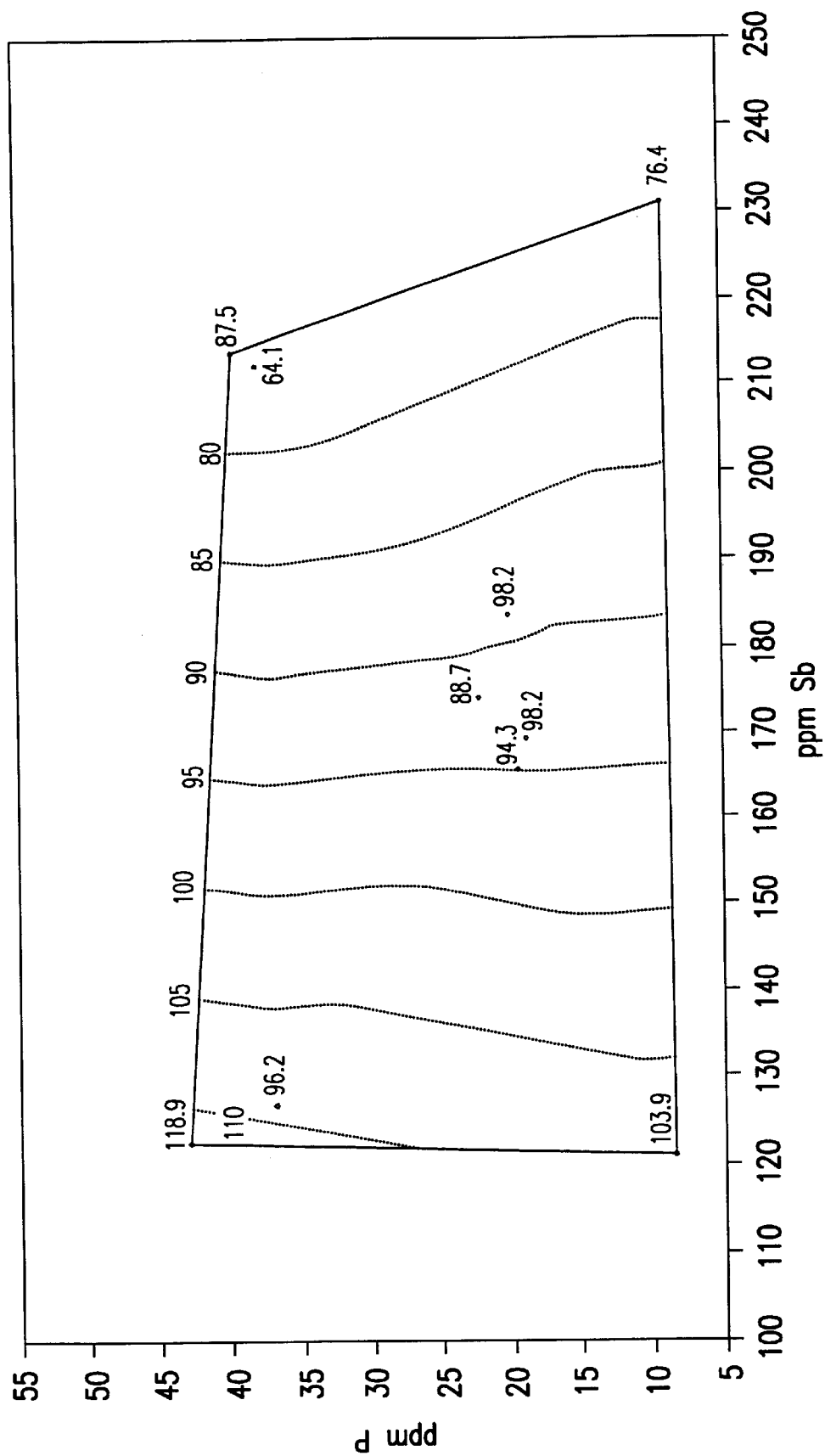
FIG. 2 illustrates the effect on reaction rate, as represented by the time in the polycondensation stage, of changing phosphorus additive and antimony catalyst levels when acidic phosphorus-containing compounds are introduced prior to the esterification step and antimony catalyst are introduced prior to the prepolymer stage.

The observed finisher times, the phosphorus addition points, and the measured values of both antimony and phosphorus were used to generate a response surface model with JMP™ statistical software. The contour plots shown in FIGS. 1 & 2 were generated from the response surface model. The numbers on these figures correspond to finisher time in minutes. FIG. 1 illustrates the effect on finisher time of changing phosphorus levels and antimony levels when phosphoric acid is added just prior to the prepolymer stage and the antimony catalyst is added up front to the TPA/EG/CHDM paste. FIG. 2 illustrates the effect on finisher time of changing phosphorus levels and antimony levels when phosphoric acid is added up front to the TPA/EG/CHDM paste prior to the esterification stage and the antimony catalyst is added just prior to the prepolymer stage.

Examples 5–10, when phosphoric acid was added before the prepolymer stage, the diethylene glycol level in the polyester was insensitive to the level of additive present. In examples 11–14, when phosphoric acid was added before the esterification stage, the diethylene glycol (DEG) level in the polyester was sensitive to the level of additive present.

Figure 3:
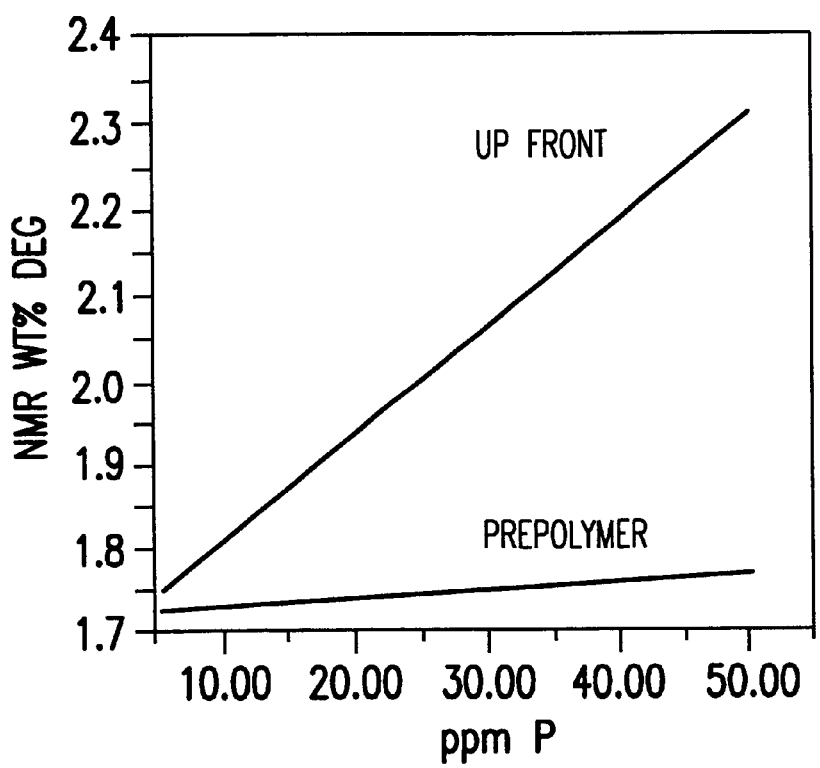
FIG. 3 illustrates the effect of introduction point for the phosphorus-containing additives on diethylene glycol (DEG) level in the polyester resin.

FIG. 3 illustrates that up front addition of phosphorus results in increasing DEG with increasing phosphorus level while prepolymer addition of phosphorus results in little change in DEG level with increasing phosphorus level where "upfront" means prior to the esterification step and when "prepolymer" means after the esterification step and prior to the prepolymer stage. The phosphorus compound was added upfront then the antimony compound was added just prior to prepolymer. If the phosphorus compound is added prepolymer, then the antimony compound was preferably added upfront.

Solid-phase Polymerization

Two metal solid-staters were used to solid-phase polymerize the precursors. A CAMILE™ system controlled conditions in the solid-starters-except for nitrogen flow rate, which was controlled manually with a rotameter. Heated nitrogen passed through a frit that supported a bed of precursor. The set point for the nitrogen temperature just below the frit was 205° C., and the nitrogen flow rate was 14 standard cubic feet per hour. Solid-stating rate studies were done in a random order different than that used for the melt-phase polymerizations. Prior to each solid-stating rate study, the standard particle size blend was thoroughly mixed, and then a 30-gram portion of the blend was removed and poured into a metal solid-starter. The bed was made level.

A sample of approximately 0.6 grams was removed every 30 minutes for six hours. Before each sample was taken, the bed was stirred for 30 seconds using a wire whisk attached to a rod. The stirring mixed the sample bed horizontally and vertically to minimize the effect on IV of particle location in the bed. After a sample of about 0.6 grams was removed, the bed was leveled.

After each rate study was complete, about 22 grams of polymer remained in the solid-started; this material was isolated and analyzed. These samples had inherent viscosities, which ranged from 0.75 to 0.77 dL/g.

As each rate study was completed, samples were submitted for IV analysis. From the IV data, the solid-phase polymerization time to reach the product IV (0.68 dL/g) for each precursor was determined from a plot of IV as a function of time. For each precursor, the solid-stating time to 0.68 IV determined the length of the preparative solid-stating runs.

Preparative solid-stating runs were performed at the same nitrogen temperature and flow rate used during the rate studies. A random run order was generated for the preparative solid-phase polymerizations. For each precursor, fifty grams of the standard particle size blend were used for the solid-phase preparative run. Although no samples were taken, the bed was stirred and leveled every 30 minutes. The preparative samples were submitted for the following tests: IV, color, acetaldehyde generation, and solution haze.

The acetaldehyde generation test was performed at 295° C. Ten grams of polymer were dried at 120° C. overnight. The polymer was placed in a melt indexer for 5 minutes at 295° C., extruded and quenched. The polymer was cryogenically ground and sieved ($\leq$20 mesh particle size). An inert gas was passed across the sample (0.50±0.05 grams) at 150° C. for 10 minutes. The gas was then sent to a trap cooled with liquid nitrogen. The trap was then heated to 300° C., and the acetaldehyde was swept into a gas chromatography for measurement.

The solution haze was measured by dissolving the polymer (10.0 g) in a mixture of methylene chloride and hexafluoro isopropyl alcohol (130 mL, 70:30 v/v). The turbidity of the solution was measured with a Hach Ratio Nephelometric Turbidimeter. The mixtures were centrifuged to isolate the particulates when the solution haze values were $\geq$5 ntu except Examples 15 and 18. The particulates were analyzed by x-ray diffraction (XRD) to identify crystalline species and by energy dispersive spectroscopy (EDS) to identify the elements, present, including those in amorphous species.

Example 15: Solid Stating of Polymer with 117 ppm of Antimony and 8 ppm of Phosphorus (Antimony Early/Phosphoric Acid Late)

Polymer was solid stated for 1 hour and 48 minutes. Analyses on the polymer resulted in the following data: IV of 0.665 dL/g, a L* color of 88.8, an a* color of –1.0, a b* color of 4.6, an acetaldehyde generation at 295° C. of 12.5 ppm, and a solution haze value of 4.5 ntu. Per XRD, the particulates contained antimony oxide. EDS indicated that Sb was present in the particulates.

Example 16: Solid Stating of Polymer with 147 ppm of Antimony and 41 ppm of Phosphorus (Antimony Early/Phosphoric Acid Late)

Polymer was solid stated for 2 hours and 13 minutes. Analyses on the polymer resulted in the following data: IV of 0.666 dL/g, a L* color of 89.3, an a* color of –1.1, a b* color of 5.0, an acetaldehyde generation at 295° C. of 12.2, and a solution haze value of 4.3 ntu.

Example 17: Solid Stating of Polymer with 140 ppm of Antimony and 48 ppm of Phosphorus (Antimony Early/Phosphoric Acid Late)

Polymer was solid stated for 3 hours and 10 minutes. Analyses on the polymer resulted in the following data: IV of 0.673 dL/g, a L* color of 88.9, an a* color of –1.0, a b* color of 5.2, an acetaldehyde generation at 295° C. of 11.5 and a solution haze value of 4.4 ntu.

Example 18: Solid Stating of Polymer with 211 ppm Antimony and 7 ppm of Phosphorus (Antimony Early/Phosphoric Acid Late)

Polymer was solid stated for 1 hour and 51 minutes. Analyses on the polymer resulted in the following data: IV of 0.662 dL/g, an acetaldehyde generation of 295° C. of 15.1 ppm, and a solution haze value of 4.7 ntu. Per XRD, the particulates contained antimony oxide. EDS indicated that Sb was present in the particulates.

Example 19: Solid Stating of Polymer with 227 ppm of Antimony and with 40 ppm of Phosphorus (Antimony Early/Phosphoric Acid Late)

Polymer was solid stated for 2 hours and 37 minutes. Analyses on the polymer resulted in the following data: IV of 0.691 dL/g, a L* color of 89.2, an a* color of –1.0, a b* color of 4.2, an acetaldehyde generation at 295° C. of 13.0, and a solution haze value of 5.5 ntu. Per XRD, the particulates contained antimony oxide and antimony phosphate. EDS indicated that antimony and phosphorus were present in the particulates.

Example 20: Solid Stating of Polymer with 233 ppm of Antimony and with 50 ppm of Phosphorus (Antimony Early/Phosphoric Acid Late)

Polymer was solid stated for 2 hours and 36 minutes. Analyses on the polymer resulted in the following data: IV of 0.686 dL/g, a L* color of 89.2, an a* color of –1.0, a b* color of 3.9, an acetaldehyde generation at 295° C. of 12.2 ppm, and a solution haze value of 6.8 ntu. Per XRD, the particulates contained antimony oxide and antimony phosphate. EDS indicated that antimony and phosphorus were present in the particulates.

Example 21: Solid Stating of Polymer with 8 ppm of Phosphorus and with 122 ppm of Antimony (Phosphoric Acid Early/Antimony Late)

Polymer was solid stated for 2 hours and 7 minutes. Analyses on the polymer resulted in the following data: IV of 0.673 gL/g, a L* color of 89.0, an a* color of –1.2, a b* color of 5.4, an acetaldehyde generation at 295° C. of 11.9 ppm, and a solution haze value of 4 ntu.

Example 22: Solid Stating of Polymer with 9 ppm of Phosphorus and with 231 ppm of Antimony (Phosphoric Acid Early/Antimony Late)

Polymer was solid stated for 1 hour and 45 minutes. Analyses on the polymer resulted in the following data: IV of 0.684 dL/g, a L* color of 88.3an a* color of −1.4, a b* color of 5.4, an acetaldehyde generation at 295° C. of 11.7 ppm, and a solution haze value of 5 ntu. Per XRD, the particulates contained antimony oxide. EDS indicated that antimony was present in the particulates.

Example 23: Solid Stating of Polymer with 43 ppm of Phosphorus and with 123 ppm of Antimony (Phosphoric Acid Early/Antimony Late)

Polymer was solid stated for 1 hour and 47 minutes. Analyses on the polymer resulted in the following data: IV of 0.673 dL/g, a L* color of 88.6, an aI color of −0.9 a b* color of 5.5, an acetaldehyde generation at 295° C. of 14.0 ppm, and a solution haze value of 3.1 ntu.

Example 24: Solid Stating of Polymer with 39 ppm of Phosphorus and with 214 ppm of Antimony (Phosphoric Acid Early/Antimony Late)

Polymer was solid stated for 1 hour and 34 minutes. Analyses on the polymer resulted in the following data: IV of 0.678 dL/g, a L* color of 88.1, an a* color of −0.8, a b* color of 5.2, an acetaldehyde generation at 295° C. of 14.1 ppm, and a solution haze value of 3.9 ntu.

Per Examples 19 and 20, when relatively high levels of phosphoric acid were added to an esterification product containing antimony, antimony phosphate and antimony oxide were found in the particulates isolated from the solution haze sample. As can be seen in Example 18, as the level of phosphorus was lowered between 10 ppm, and $Sb_2O_3$ was found in the particulates isolated from solution haze sample. Potential haze problems due to antimony phosphate formation were precluded by addition of antimony first and phosphorus later.

Example 25: Phosphate Triester as the Phosphorus Additive

When a phosphate triester like tri-t-butyl phosphate is the phosphorus source, the trends in polycondensation rate are different than those observed for phosphoric acid. When the antimony catalyst is added early and the phosphate triester is added late, the melt-phase finisher time is relatively insensitive to the phosphorus level, especially at high antimony levels. The dramatic increase in finisher time with increasing phosphorus level for early antimony/late phosphoric acid addition is not seen when the phosphorus source is a phosphate triester. When the antimony catalyst is added early and the phosphate triester is added late, antimony oxide alone is found in the particulates isolated from solution haze samples.

In contrast to the situation with late addition of phosphoric acid, particulate haze from antimony phosphate is not a concern when a phosphate triester is added late. When the phosphate triester is added early and the antimony is added late, the melt-phase finisher time increases with increasing phosphorus level. Therefore, the stability in finisher time with increasing phosphorus level for early phosphoric acid/late antimony addition was not seen in connection with the use of phosphate triesters.

While the invention has been described in terms of various preferred embodiments thereof, it should be understood that various modifications, changes, substitutions, omissions and the like may be made without departing from the spirit of the invention. Thus, the scope of the invention is limited only by the scope of the following claims including equivalents thereof.

What is claimed is:

1. A process for making polyester resin comprising:
 (a) esterifying at least one dicarboxylic acid component and at least one diol component; and
 (b) polymerizing the product of step (a) under conditions effective to provide a polyester resin,
 wherein:
 (1) polymerization step (b) occurs in the presence of (i) an antimony-based polymerization catalyst and (ii) an acidic phosphorus-containing additive, which is selected such that the reaction rate of the polymerization step (b) increases with a decreasing amount of additive (ii);
 (2) the catalyst (i) is added prior to, or together with, the additive (ii), and
 (3) the acidic phosphorus containing additive (ii) is present in an amount less than about 15 ppm by weight based on elemental phosphorus in the resulting polyester.

2. A process for making a polyester resin comprising:
 (a) esterifying at least one dicarboxylic acid component and at least one diol component; and
 (b) polymerizing the product of step (a) under conditions effective to provide a polyester resin,
 wherein:
 (1) polymerization step (b) occurs in the presence of (i) an antimony-based polymerization catalyst and (ii) an acidic phosphorus-containing additive, with the catalyst (i) being added prior to, or together with, the additive (ii), and
 (2) the amount of additive (ii) is selected so as to provide a polyester resin that is at least substantially free of inorganic compounds which can be formed by the reaction of the catalyst (i) and additive (ii), which amount is less than about 15 ppm by weight based on elemental phosphorus in the resulting polymer.

3. The process according to claim 1, wherein the antimony-based polymerization catalyst (i) is added prior to addition of the acidic phosphorus-containing additive (ii).

4. The process according to claim 1, further comprising:
 (c) solid-phase polymerization of the polyester resin from step (b).

5. The process according to claim 1, further comprising a prepolymer reaction stage between the esterification stage (a) and polymerization stage (b).

6. The process according to claim 5 wherein the esterification and/or prepolymer stage includes one or more substages and the antimony-based catalyst (i) is added at least one substage before the additive (ii).

7. The process according to claim 5 wherein the acidic phosphorus-containing additive (ii) is added immediately prior to, or during the prepolymer stage or immediately prior to polymerization.

8. The process according to claim 1, wherein the antimony-based polymerization catalyst (i) is added immediately prior to, during, or immediately after the esterification stage (a).

9. The process according to claim 1, wherein the acidic phosphorus-containing additive (ii) is added immediately after the esterification stage (a).

10. The process according to claim 1, wherein the polymerization step (b) is performed in the absence of added cobalt compound(s).

11. The process according to claim 1, wherein the polyester resin is a poly(ethylene terephthalate) (PET) resin or a modified PET resin.

12. The process according to claim 1, wherein the at least one dicarboxylic acid comprises terephthalic acid.

13. The process according to claim 12 wherein the terephthalic acid is present in an amount of from about 80 mole % to about 95 mole %.

14. The process according to claim 1, wherein the at least one diol component comprises a glycol having from about 2 to about 10 carbon atoms.

15. The process according to claim 1, wherein the at least one diol component comprises ethylene glycol.

16. The process according to claim 15 wherein the ethylene glycol is present in an amount of from about 80 mole % to about 95 mole %.

17. The process according to claim 1, wherein the polyester resin is modified with at least one additional dicarboxylic acid component is selected from aromatic dicarboxylic acids having 8 to 14 carbon atoms, aliphatic dicarboxylic acids having 4 to 12 carbon atoms, cycloaliphatic dicarboxylic acids having 8 to 12 carbon atoms and mixtures thereof, which additional component(s) are present in the amount of about 1 mole % to about 20 mole %.

18. The process according to claim 17, wherein the at least one additional dicarboxylic acid component is phthalic acid, isophthalic acid, 2,6-naphthalenedicarboxylic acid, 1,4-cyclohexanedicarboxylic acid, 1,3-cyclohexanedicarboxylic acid, diphenyl-4,4'-dicarboxylic acid, stilbenedicarboxylic acid, succinic acid, glutaric acid, adipic acid, sebacic acid, cyclohexane diacetic acid, azelaic acid or 1,12-dodecanedioic acid.

19. The process according to claim 1 wherein the polyester resin is modified with at least one additional diol component selected from cycloaliphatic diols having 6 to 20 carbon atoms, aliphatic diols having 3 to 20 carbon atoms, and mixtures thereof, which additional component(s) are present in the amount of about 1 mole % to about 20 mole %.

20. The process according to claim 19, wherein the at least one additional diol component is 1,4-cyclohexanedimethanol (CHDM), diethylene glycol, triethylene glycol, 1,2-propanediol, 1,3-propanediol, nepentyl glycol, 1,4-butanediol, 1,5-pentanediol, 1,6-hexanediol, 1,2-cyclohexanediol, 1,4-cyclohexanediol, 1,2-cyclohexanedimethanol, 1,3-cyclohexanedimethanol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, 2,2-bis-(4-hydroxypropoxyphenyl)-propane, 1,2-cyclohexanediol, 1,4-cyclohexanediol or mixtures thereof.

21. The process according to claim 1, wherein the esterification step (a) comprises direct esterification.

22. The process according to claim 1, wherein the polymerization step (b) is a polycondensation reaction and the catalyst (i) is a polycondensation catalyst.

23. The process according to claim 1 wherein the antimony-based catalyst (i) is a diol-soluble compound of antimony (III) or antimony (V) or a compound of antimony (III) or antimony (V) that becomes soluble in a diol upon reaction with the diol.

24. The process according to claim 1, wherein the antimony-based catalyst (i) is selected from the group of antimony (III) oxide, antimony (III) acetate; antimony (III) glycolates, antimony (III) ethyleneglycoxide and mixtures thereof.

25. The process according to claim 1, wherein the antimony-based catalyst (i) is antimony oxide which is present in an amount effective to provide an elemental antimony level of from about 75 ppm to about 400 ppm bond on the weight of the polymer.

26. The process according to claim 1, wherein the acidic phosphorus-containing additive (ii) comprises phosphoric acid, phosphorous acid, polyphosphoric acid, acidic phosphate esters or mixtures thereof.

27. The process according to claim 1, wherein the acidic phosphorus-containing additive (ii) comprises phosphoric acid.

28. The process according to claim 1, wherein the acidic phosphorus-containing additive (ii) is present in the amount effective to provide 1 to about 10 ppm of elemental phosphorus in the polymer.

29. The process according to claim 1 wherein the polymer from step (b) is at least substantially free of antimony phosphate compounds.

30. The process according to claim 1, wherein the polyester resin has an intrinsic viscosity of about 0.4 to about 1.2 dL/g measured at 25 C by dissolving 250 mg of polyester in 50 mL or a solvent consisting of a 60:40 ratio by weight of phenol and tetrachloroethane.

31. The process according to claim 3, wherein the polymerization step (b) is performed in the presence of at least one organic toner selected from among red organic toners, and blue organic toners, which toner(s) are present in the polyester in an amount of about 0.5 to about 10 ppm.

32. In a process for making a polyester resin employing a polycondensation step in the presence of (i) a polycondensation catalyst and (ii) a phosphorus-containing additive, wherein the improvement comprises:

(a) the use of an acidic phosphorus-containing compound as the additive (ii) and (b) introducing the phosphorus-containing additive (ii) after the polycondensation catalyst (i) in an amount not greater than about 15 ppm of elemental phosphorus based on the polyester.

33. The process according to claim 32 wherein the polycondensation catalyst (i) is an antimony-based catalyst.

34. A polyester resin produced by the process according to claim 1.

35. A polyester resin produced by the process according to claim 2.

36. A polyester resin containing (a) elemental phosphorus present in an amount not greater than 15 ppm and (b) at least one organic toner selected from among organic blue toners and organic red toners, which toner(s) are present in an amount of about 0.5 to about 10 ppm.

37. The polyester resin according to claim 36 where the elemental phosphorus-containing is present in amount not greater than about 10 ppm.

38. The polyester resin according to claim 36 having at least one organic red toner present in an amount of about 0.5 to about 3 ppm.

39. The polyester resin according to claim 36 having at least one organic blue toner present in an amount of about 1 to about 7 ppm.

* * * * *